Aug. 20, 1963 LE ROY J. VANDENBERG 3,101,110
HEAT-REFLECTIVE TIRE
Filed Nov. 3, 1961
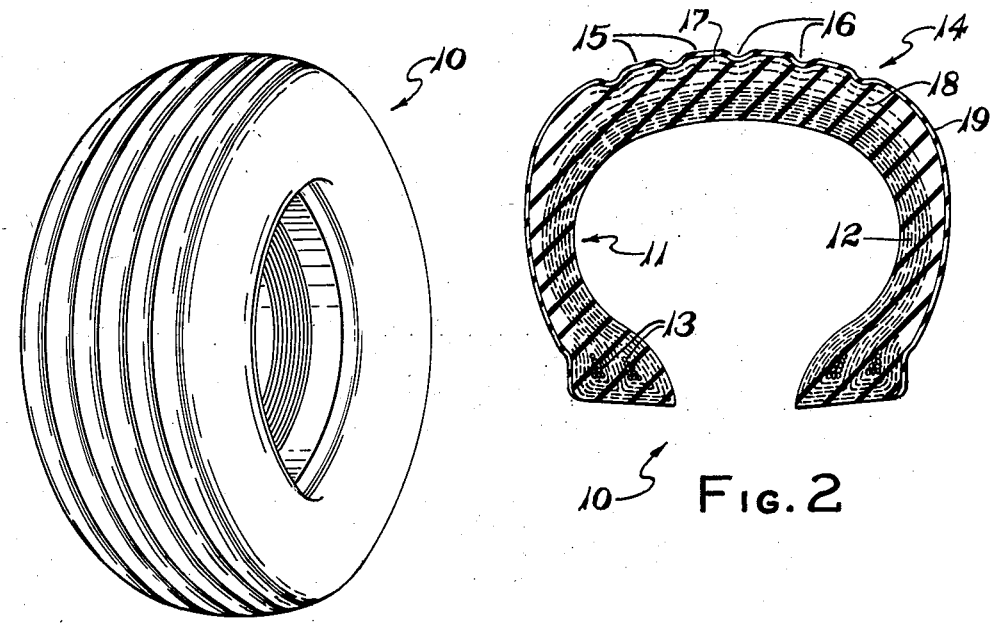
Fig.1
Fig.2
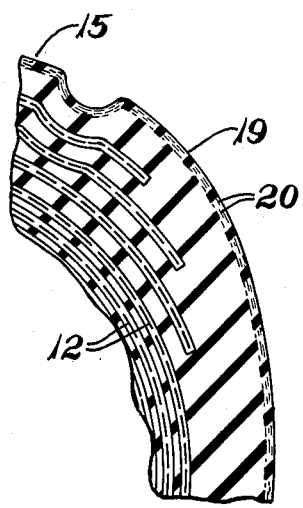
Fig.3
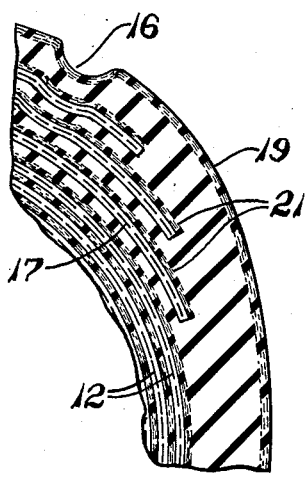
Fig.4
INVENTOR.
LEROY J. VANDENBERG
BY W. A. Shira, Jr.
ATTY.

United States Patent Office 3,101,110
Patented Aug. 20, 1963

3,101,110
HEAT-REFLECTIVE TIRE
Le Roy J. Vandenberg, Akron, Ohio, assignor to The
B. F. Goodrich Company, New York, N.Y., a corporation of New York
Filed Nov. 3, 1961, Ser. No. 149,932
13 Claims. (Cl. 152—357)

This invention relates to tires and, more particularly, to a heat-reflective pneumatic tire for use on vehicles under conditions in which the tires will be subject to high temperatures.

Tires for high-speed aircraft are retracted during flight into compartments where they are frequently subject to ambient temperatures which may be in the order of several hundred degree Fahrenheit due, at least in part, to the frictional effect of the surrounding atmosphere upon the outer walls of the tire compartments. These high temperatures are injurious to tires of conventional construction which comprise a carcass of multiple plies of rubber covered cords and a tread of rubber that may also include cord reinforcements. Such tires, because of the need for maximum strength, normally have the reinforcing cords formed of nylon. Hence, when these tires are subjected to high temperature, the dimensions thereof change due to the increased pressure of the contained air and the thermal effects upon the nylon cords. In addition, the rubber compounds employed in the tires may be damaged.

These effects of high ambient temperature upon tires have resulted in a condition where high-speed aircraft cannot be safely operated without frequent replacement of the tires on the landing gear. Moreover, aircraft are now being designed and tested which cannot be operated at the maximum possible speed due to the inability of conventional tires to insure safe landings after being subjected to the ambient temperatures that will occur during flight. Tires for vehicles other than aircraft are also frequently subject to high ambient temperatures during storage and use which can produce defects and/or premature failure of the tires.

The principal object of this invention is, therefore, the provision of an improved vehicle tire which can safely endure high ambient temperatures when not in use and/or high temperatures created in the tire during use.

The essence of this invention resides in the recognition that tires subject to high ambient temperatures can be made to safely withstand such condition by incorporating in the tires a heat-reflective material. This material, provided as an integral cover on the exterior of the tire and/or in spaced layers within the tire, reflects at least a part of the heat incident upon the tire so that the interior of the tire is maintained for extended periods of time at a temperature lower than the ambient temperature of the environment in which the tire is placed thereby preventing ply separation, reversion of rubber and other defects resulting from excessive temperatures.

Other objects and advantages of the invention will be apparent to those skilled in the art to which this invention pertains from the following description of a preferred embodiment, and certain modifications thereof, described with reference to the accompanying drawings, forming a part of this application, and in which:

FIG. 1 is a perspective view of an inflatable vehicle tire provided with a heat-reflective layer upon the exterior thereof in accordance with the invention;

FIG. 2 is a transverse section through a portion of the tire shown in FIG. 1;

FIG. 3 is an enlarged fragmentary section through a portion of the tread and sidewall of the tire shown in FIGS. 1 and 2, more clearly illustrating the nature of the heat-reflective layer on the exterior surface of the tire; and FIG. 4 is a view similar to FIG. 3 but showing an embodiment of the invention wherein layers of heat-reflective material are provided between the plies of the tire carcass and tread as well as on the external surface of the tire.

The invention is illustrated in the drawings as it is incorporated in an inflatable pneumatic tire 10 of the type employed for landing gear of high-speed aircraft. Such a tire, which is generally toroidal in configuration, comprises a carcass 11 formed of multiple plies 12 of rubber covered reinforcing cords the edges of which are turned about bead cores 13 to provide spaced bead portions that are engageable with the rim of a wheel on which the tire is mounted. The carcass is surmounted by a tread or running surface 14 provided with a suitable non-skid configuration which is here shown as a plurality of circumferentially extending ribs 15 with intervening grooves 16, the transverse configuration of the tread surface being generally sinuous. The tread is also preferably reinforced by a plurality of plies 17 of textile cords with these plies spaced from each other by greater distances than the spacing between the reinforcing plies 12 in the carcass. This is effected by forming the tread by successive superposition of layers of tread rubber 18 and the reinforcing plies 17. Preferably, the reinforcing cords in the plies 12 of the carcass and in the plies 17 of the tread are formed of nylon.

Tires of the type described have been successfully used on aircraft which must take off and land at high speeds. However, neither these tires, nor any other previously known inflatable tires, have been capable of withstanding high ambient temperatures of several hundred degrees for prolonged periods of time without reversion of the elastomers employed therein with consequent ply separation and other defects which cause premature tire failures. Hence, development and use of aircraft which fly at speeds producing high ambient temperatures in the retracted tires have been seriously hampered.

A tire constructed in accordance with this invention is rendered capable of withstanding high ambient temperatures for prolonged periods of time without injury by integrally incorporating heat-reflective material therein. This material, which may be provided as a veneer or covering over the entire external surface of the tire, either with or without additional layers of such material internally of the tire, and/or with the elastomer of the tread and carcass provided throughout with such material, acts to reflect at least a part of the heat instant upon the tire so that the internal temperature of the tire remains lower than its environment for prolonged periods of time.

In the embodiment illustrated in FIGS. 2 and 3, the tire has the entire external surface of the tread and carcass provided with an integral layer 19 of an elastomer containing heat-reflective material in the form of finely-divided particles 20. This material, which may be metallic, organic or inorganic, is preferably plate-like particles of a light colored substance which does not oxidize to a dark color when heated with the particles present in sufficient quantity to give the appearance of a uniform silvery layer on the tire. The particles are not simply sprayed or painted on the tire but are incorporated in and united by an elastomer forming an integral part of the tire so that the surface protection is not lost by flaking or scuffing but is retained on the tire, except for the surfaces of the ground-engaging tread ribs 15, during operation.

The presently preferred composition of the surface layer or veneer is as follows:

| Ingredients: | Parts by weight |
|---|---|
| Natural rubber | 100.00 |
| Hydrated silica | 40.00 |
| Stearic acid | 1.00 |
| Zinc oxide | 5.00 |
| Titanium dioxide | 10.00 |
| 4-methyl-6-tert-butyl phenol | 2.50 |
| Benzo-thiazyl-disulfide | 2.25 |
| Zinc salt of di-butyl-dithio-carbamic acid | 0.50 |
| Aluminum powder (flakes) | 10.00 |
| Morpholine disulfide | 3.00 |
| | 174.25 |

The aluminum powder may be of the type employed for pigment in paints. For example, one suitable material is that sold by Reynolds Metals Co. under the designation 40XD. This material has a maximum retention on the U.S. Screen No. 325 of 0.1%.

The aluminum powder is incorporated in the above composition by procedures well known in the rubber compounding art and the material is then calendered or extruded into sheets of appropriate thickness for application to the uncured tread and carcass of the tire 10. In the preferred embodiment, the thickness of the layer 19 in the tread region of the tire is .020 to .050 inch while the thickness of the layer on the sidewall is .080 inch. After the veneer or surface layer 19 has been applied to the entire external surface of the tire 10, the latter is shaped and cured in the conventional manner. The entire external surface of the completed tire, shown in FIG. 1, is silver colored in appearance since the aluminum is present in sufficient quantity that it appears to form a uniform metallic surface on the tire.

A tire thus constructed and provided with the heat-reflective veneer or layer 19 has been subjected, while inflated, to heating in an oven at a temperature in excess of 350° F. for intervals of approximately five hours each without any damage to the tire. During such heating, thermocouple tests made of the temperature of the contained air and of the tread region, interiorly of the surface layer or veneer 19, showed these temperatures to be lower than the ambient temperature of the environment with the differential gradually decreasing toward the end of the testing period.

Tires of this construction also have been dynamically tested in combination with soaking treatments without failure. Thus, a 40 x 17.50-18, 36 ply rating, aircraft tire, utilizing the heat-reflective composition on the exterior of the tire, successfully completed nine cycles of the following Test A and one cycle of Test B, at the Aeronautical Systems Division at Wright-Patterson Field, Dayton, Ohio, the dynamic portions of the test being performed upon a 120" indoor dynamometer.

Test A (1) Taxiing and Takeoff: Simulated taxiing of an aircraft by running the tire a distance of two miles under a load of 50,000 pounds followed immediately by a simulated aircraft take-off by running the tire at top speed of the dynamometer (in excess of 250 miles per hour).

(2) Heat Soak: The inflated tire was placed in an oven and retained therein for approximately five hours at a temperature in excess of 350° F. in simulation of the thermal conditions encountered during hypersonic flight.

(3) Landing and Taxiing: Immediately following the heat soak, the hot tire was subjected to a simulated aircraft landing at a speed in excess of 200 miles per hour followed immediately by a simulated aircraft taxiing for a distance of two miles.

Test B

A rejected take-off of an aircraft was simulated by running the tire on the dynamometer under full load at a speed in excess of 200 miles per hour and then bring the tire to a full stop.

The tire so tested showed no evidence of separation of its components or other failure. Moreover, it was found that the veneer was worn off only on the surfaces of the central ribs 15 but had not been lost from the surfaces of the shoulder and second inboard ribs nor in the tread grooves or sidewalls.

FIG. 4 of the drawings illustrates another embodiment of the invention wherein the tire is provided not only with an external veneer or covering layer 19 over the entire tread and sidewalls but also with layers 21, containing the heat-reflective material, over each of the carcass plies 12 and tread plies 17. The composition of the elastomer with the heat-reflective material incorporated therein may be the same as that described above for the embodiment illustrated in FIG. 2. In the instant embodiment, the surface layer 19 has the dimensions previously described but the layers 21, containing the heat-reflective material on the reinforcing plies of the carcass and tread, preferably have a thickness of 0.015 inch. The layers 21 may be applied to the reinforcing plies either as the latter are superposed in the manufacture of the tire, or laminated to the plies previous to the application of the ply material upon the tire building drum. A tire having the construction as shown in FIG. 4 is shaped and cured in the conventional manner and has the above described silvery appearance and heat-reflective characteristics of the tire constructed in accordance with FIGS. 2 and 3. A tire of the construction shown in FIG. 4, however, has increased heat-reflective properties since heat penetrating through the outer or surface portions of the tire is reflected back by the layers of heat-reflective material 21 on the reinforcing plies.

The invention has been described with reference to a specific composition containing the heat-reflective material. It will be apparent, however, that variations may be made in the composition without departing from the invention. For example, the content of the heat-reflective particles, i.e., aluminum, may be varied from 10 to 25 parts for 100 parts of elastomer and the elastomer can be other than natural rubber so long as it is capable of good adhesion with the natural rubber normally employed as the coating for the reinforcing cords of the tire. Also, particles other than aluminum may be employed so long as these are similar in properties to aluminum. Moreover, the size of the particles can be varied from the value given in the specific embodiment.

It will also be apparent to one skilled in the art of compounding elastomers that the composition containing the heat-reflective material can be varied, especially with respect to the ingredients employed for providing acceleration and curing of the composition. By way of further example, but without limitation thereto, the zinc salt and the morpholine disulfide can be replaced by the following:

| Ingredients: | Parts |
|---|---|
| Insoluble sulfur | 3.15 |
| Diphenyl-guanidine | 1.00 |

Other variations in the materials and quantities thereof will likewise be readily apparent to those skilled in the art of elastomer compounding.

The invention likewise is not limited to the specifically described thicknesses for the veneer employed on the external surface of the tire nor to the specifically recited thickness of the layer of heat-reflective material employed upon the reinforcing plies. In fact, it is possible to provide the entire rubber portions of the tread and sidewall coverings of the tire in the form of a heat-reflective composition of this invention rather than simply employing it as layers upon the surface of the tire and/or upon the reinforcing plies.

The specific embodiments of the invention have been described with reference to the use of nylon as the reinforcing cords in the carcass and tread of the tire since these provide the strength required for high-speed aircraft tires. Such cords, however, are thermosensitive and tend to change dimension with increased temperature in spite of prior heat conditioning of the cords. In fact, it has been found that a tire constructed as described with reference to FIGS. 2 and 3 of this invention, but without protection by the heat-reflective material of this invention, not only was subject to injury of the rubber or other elastomers during heat-soaking tests but also measurably grew or increased in dimensions with the nylon cords near the surface of the tire being partially exposed, especialy in the tread portions thereof. This growth of the tire with nylon cord reinforcements and resulting partial exposure of the cords was very materially less when the heat-reflective material of this invention was employed.

Inflatable tires provided with heat-reflective material, in accordance with this invention, have their greatest utility for use on high-speed aircraft. The invention is not, however, limited to such use since tires not intended for aircraft use likewise may be protected against high ambient temperatures and/or high operating temperatures by employing therein the heat-reflective material as heretofore described with specific reference to its use in aircraft tires. Hence, the invention is not to be considered as limited to use in aircraft tires nor to the specific compositions and dimensions given by way of example except as may be required by the appended claims.

Having thus described the invention, I claim:

1. A vehicle tire adapted for use in an environment where it is subject to high temperatures, the said tire comprising a carcass and tread the entire outer surface of which is covered with an integral heat-reflective layer of an elastomer containing finely-divided flake-like particles of heat-reflective material dispersed throughout the layer in sufficient quantity that the tire appears to have a continuous surface of the said material.

2. A vehicle tire as defined in claim 1 wherein the heat-reflective material is a metal in the form of small flake-like particles of the nature and size used as paint pigments.

3. A vehicle tire as defined in claim 1 wherein the said heat-reflective material is powdered aluminum present in the range of 10–25 parts by weight for each 100 parts by weight of the elastomer in said heat-reflective layer.

4. A vehicle tire as defined in claim 3 wherein the thickness of said heat-reflective layer is in the range of .020 to .080 inch.

5. An inflatable vehicle tire adapted for use in an environment where it is subject to high ambient temperatures, the said tire comprising a carcass and tread both formed of cord-reinforced elastomer with the entire outer surface of the tire covered by an integral heat-reflective layer of an elastomer containing finely-divided flake-like particles of heat-reflective material of the size employed as paint pigment and present in sufficient quantity so that the outer surface of the tire appears to be completely covered by a uniform layer of the heat-reflective material.

6. An inflatable vehicle tire adapted for use in an environment where it is subject to high ambient temperatures, the said tire comprising a generally toroidal carcass formed of cord-reinforced elastomer, a laminated tread on said carcass comprising superposed layers of elastomer and reinforcing cords, and an integral heat-reflective layer of an elastomer containing small, flake-like particles of heat-reflective metal of a size employed as paint pigment covering the entire outer surface of the tire with the metal particles present in the range of 10–25 parts by weight for each 100 parts by weight of the elastomer.

7. A pneumatic tire suitable for use on high-speed aircraft, the said tire comprising a generally toroidally shaped carcass formed of a plurality of plies of rubber covered cords, a laminated tread on said carcass including alternate layers of tread rubber separated by layers of reinforcing cords, and an integral heat reflective cover over the entire surface of said tread and carcass with the said cover comprising rubber containing paint-pigment size flake-like particles of aluminum present in the range of 10–25 parts by weight of aluminum to 100 parts by weight of rubber.

8. A pneumatic tire suitable for use on high-speed aircraft, the said tire comprising a generally toroidally shaped carcass formed of a plurality of plies of rubber covered nylon cords, a laminated tread on said carcass including alternate layers of tread rubber separated by layers of nylon cords, and an integral heat-reflective cover over the entire surface of said tread and carcass with the said cover comprising rubber containing paint-pigment size flake-like particles of aluminum present in the order of 10 parts by weight of aluminum to 100 parts by weight of rubber.

9. A pneumatic tire suitable for use on high-speed aircraft, said tire comprising a generally toroidally shaped carcass formed of a plurality of plies of rubber and reinforcing cords, a tread on said carcass with the said tread formed of layers of rubber separated by layers of reinforcing cords, each of said layers of cords in both the carcass and the tread being covered by a thin layer of rubber containing paint-pigment size flake-like particles of heat-reflective material, and the entire external surface of the tire being covered by an integral layer of rubber and paint-pigment size flake-like heat-reflective particles with the said particles present in sufficient quantity so that the tire appears to be covered by a uniform layer of the heat-reflective material.

10. A pneumatic tire suitable for use on high-speed aircraft, said tire comprising a generally toroidally shaped carcass formed of a plurality of plies of rubber and reinforcing cords, a tread on said carcass with the said tread formed of layers of rubber separated by layers of reinforcing cords, each of said layers of cords in both the carcass and the tread being covered by a thin layer of rubber containing paint-pigment size flake-like particles of aluminum, and the entire external surface of the tire being covered by an integral layer of rubber and paint-pigment size flake-like particles of aluminum with the quantity of aluminum on the exterior of the tire sufficient to provide the appearance of a uniform coating.

11. A pneumatic tire suitable for use on high-speed aircraft, said tire comprising a generally toroidally shaped carcass formed of a plurality of plies of rubber coated nylon cords, a tread on said carcass with the said tread formed of layers of rubber separated by layers of nylon cords, each of said layers of cords in both the carcass and the tread being covered by a thin layer of rubber containing paint-pigment size flake-like particles of aluminum, and the entire external surface of the tire being covered by an integral layer of rubber and paint-pigment size flake-like particles of aluminum with the aluminum present in the range of 10 to 25 parts by weight for each 100 parts by weight of the rubber.

12. A tire as defined in claim 11 wherein the thickness of the rubber layer containing particles of aluminum on each of said layers of cords is in the order of 0.015 inch.

13. A tire as defined in claim 12 wherein the thickness of the layer of rubber containing particles of aluminum on said tread is in the range of 0.020 to 0.050 inch and the thickness of the layer of rubber containing particles of aluminum on the sidewalls of the tire is in the order of 0.080 inch.

References Cited in the file of this patent

UNITED STATES PATENTS

| | | |
|---|---|---|
| 1,022,333 | Rouilliard | Apr. 2, 1912 |
| 1,175,624 | Fawkes | Mar. 14, 1916 |
| 2,521,305 | Olson | Sept. 5, 1950 |

FOREIGN PATENTS

| | | |
|---|---|---|
| 505,527 | Italy | Dec. 17, 1954 |